B. CLOUGH.
Corn Sheller.
No. 37,674.
Patented Feb. 17, 1863.
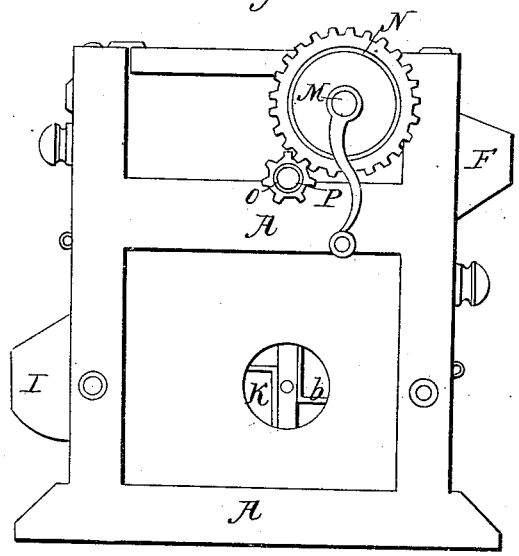
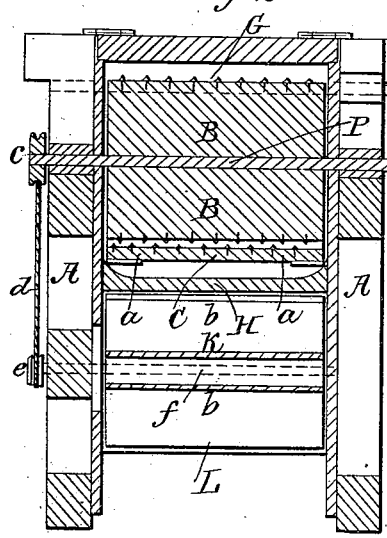
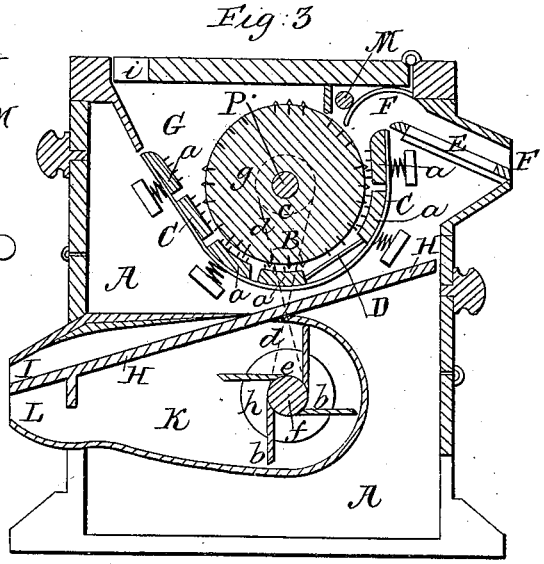
Witnesses.
R. H. Eddy
F. P. Hale Jr
Inventor.
Benjamin Clough

UNITED STATES PATENT OFFICE.

BENJAMIN CLOUGH, OF NATICK, MASSACHUSETTS.

IMPROVEMENT IN MACHINES FOR SHELLING AND WINNOWING CORN.

Specification forming part of Letters Patent No. 37,674, dated February 17, 1863.

*To all whom it may concern:*

Be it known that I, BENJAMIN CLOUGH, of Natick, in the county of Middlesex and State of Massachusetts, have invented an Improved Machine for Shelling and Winnowing Indian Corn; and I do hereby declare that the same is fully described and represented in the following specification and the accompanying drawings, of which—

Figure 1 is a side elevation, and Fig. 2 a transverse and vertical section, of such machine. Fig. 3 is a longitudinal section of it.

The nature of my invention consists in an improved arrangement of two grids and the cob and kernel eduction passages, with a chute, elastic toothed concave, a stripper, and fan-blower.

In the said drawings, A denotes the frame or case of the machine; B, the rotary toothed cylinder or stripper; C, an elastic concave, composed of toothed bars $a\ a\ a$, supported on springs at their ends, so as to be able to accommodate themselves to ears of corn as they pass between them and the stripper. In rear of this concave are two grids or riddles, D E, which are disposed at an angle to each other, while one of them—viz., E—is so arranged as to constitute the bottom of a discharging-passage, F, leading out of the case or chamber G of the stripper.

Underneath the two grids D E and the concave C is an inclined plane or chute, H, which terminates in a discharging spout or passage, I, which leads out of the machine in a direction immediately opposite to that of the cob-eduction passage over the grid D. Below the chute H a fan-blower, K, is arranged, and so that its discharging-outlet L shall be immediately underneath the spout I, as shown in Fig. 3.

The stripper is rotated by means of a cranked driving-shaft, M, and two gears, N O, they being fixed, respectively, in the shaft M and the shaft P of the stripper. The rotary fan $b$ of the blower derives its motion from a pulley, $c$, disposed on the shaft of the stripper. Such pulley carries an endless belt, $d$, that works around another pulley, $e$, on the shaft $f$ of the rotary fan, the said pulleys and belt being shown in Fig. 3 by dotted lines—the arrows $g\ h$ serving to represent the directions of motion of the stripper and the rotary fan while the machine is at work.

In the operation of the machine the ears of corn to be shelled are to be dropped through an opening, $i$, in its top, and so as to fall between the stripper and the elastic concave, which will, by their conjoint action, rasp off the kernels of corn from the cobs, which subsequently will be discharged through the spout F. The kernels removed will fall between the bars of the concave and those of the two grids, and drop on and pass down the chute and out of the passage I, and as they fall therefrom they will be subjected to a current of air driven out of the eduction-passage of the fan-blower. In this way they will be winnowed, and the chaff or extraneous matters separated from them.

The advantages of my arrangement are, that the cobs and kernels are discharged from the machine in opposite directions, and that while the cobs are on the grid E they operate to stop the discharge of any of the kernels through the cob-passage, and facilitate their passage through the grid D. Furthermore, my arrangement is favorable to simplicity and cheapness of construction of the machine, and is productive of other useful results.

I do not claim the combination of a corn-sheller and a winnowing apparatus.

I claim—

My improved arrangement of the two grids D E and the cob and kernel eduction passages F I with the chute H, the elastic concave C, the stripper B, and fan-blower K, the whole being as shown in the drawings, and as above described.

BENJAMIN CLOUGH.

Witnesses:
R. H. EDDY,
F. P. HALE, Jr.